United States Patent
Whelan et al.

(10) Patent No.: US 7,422,711 B2
(45) Date of Patent: Sep. 9, 2008

(54) METHOD AND APPARATUS FOR FORMING AN EXTRUSION

(75) Inventors: Richard S. Whelan, Coventry (GB); Robert G. Whelan, Coventry (GB)

(73) Assignee: Plastech Multiseals Limited, Coventry (GB)

( * ) Notice: Subject to any disclaimer, the term of this patent is extended or adjusted under 35 U.S.C. 154(b) by 155 days.

(21) Appl. No.: 10/474,019

(22) PCT Filed: Apr. 5, 2002

(86) PCT No.: PCT/GB02/01635

§ 371 (c)(1),
(2), (4) Date: Apr. 21, 2004

(87) PCT Pub. No.: WO02/081179

PCT Pub. Date: Oct. 17, 2002

(65) Prior Publication Data

US 2004/0169309 A1 Sep. 2, 2004

(30) Foreign Application Priority Data

Apr. 5, 2001 (GB) ................................. 0108532.3
Jan. 30, 2002 (GB) ................................. 0202111.1

(51) Int. Cl.
  *B29C 47/06* (2006.01)
(52) U.S. Cl. ............ 264/45.9; 264/173.11; 264/173.16; 264/173.17
(58) Field of Classification Search ............... 264/173.2, 264/171.27, 173.11, 173.16; 425/133.1
See application file for complete search history.

(56) References Cited

U.S. PATENT DOCUMENTS

| | | | | |
|---|---|---|---|---|
| 3,959,431 | A | * | 5/1976 | Nissel .................... 264/173.12 |
| 4,328,273 | A | | 5/1982 | Yackiw |
| 4,405,547 | A | * | 9/1983 | Koch et al. ............. 264/173.16 |
| 5,192,586 | A | | 3/1993 | Halberstadt et al. |
| 5,211,898 | A | * | 5/1993 | Shinmoto .............. 264/173.12 |
| 5,489,402 | A | * | 2/1996 | Knoblauch et al. .......... 264/407 |
| 5,562,961 | A | | 10/1996 | Hill et al. |
| 5,679,303 | A | * | 10/1997 | Hayashi et al. ............. 264/167 |
| 5,690,972 | A | * | 11/1997 | Planeta et al. ............ 425/133.1 |
| 5,783,125 | A | * | 7/1998 | Bastone et al. ............ 264/45.3 |
| 6,458,301 | B1 | * | 10/2002 | Hendrix ..................... 264/141 |

FOREIGN PATENT DOCUMENTS

| | | |
|---|---|---|
| GB | 2 097 710 A | 11/1982 |
| GB | 2 164 894 A | 4/1986 |
| JP | 11115032 | 4/1999 |

OTHER PUBLICATIONS

International Search Report for International Application No. PCT/GB02/01635, dated Jul. 19, 2002 (previously submitted on Oct. 2, 2003).

* cited by examiner

*Primary Examiner*—Mary Lynn F Theisen
(74) *Attorney, Agent, or Firm*—Christie, Parker & Hale, LLP

(57) ABSTRACT

A method of forming an extrusion comprises passing a first, plastics material (12) through a first channel (104) in a die, passing a second, plastics material (14) through a second channel (112) in the die, and passing a third, plastics material (16) through a third channel (314) in the die. At least one of the materials is passed through a metering gap into contact with the other materials to cause the at least one material to bond with the other materials as the materials pass through the die.

12 Claims, 14 Drawing Sheets

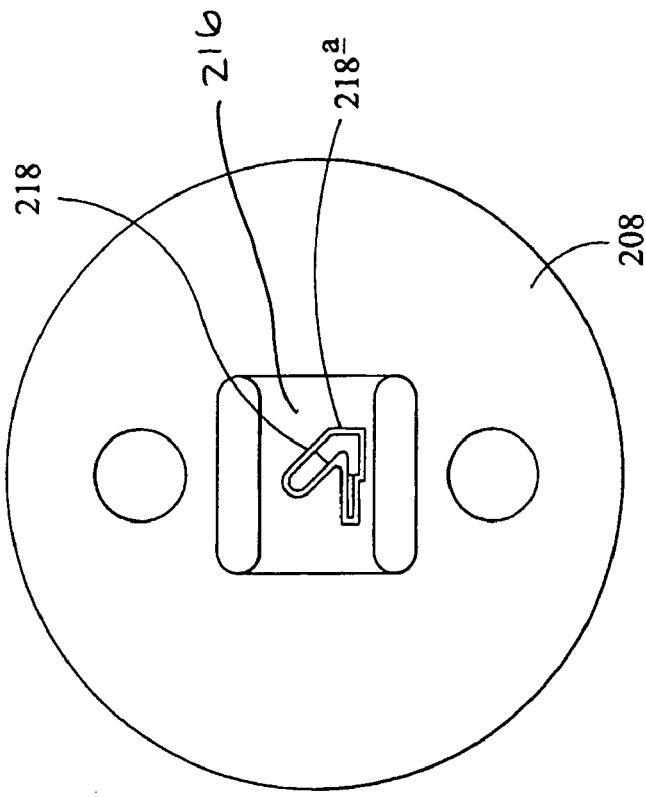
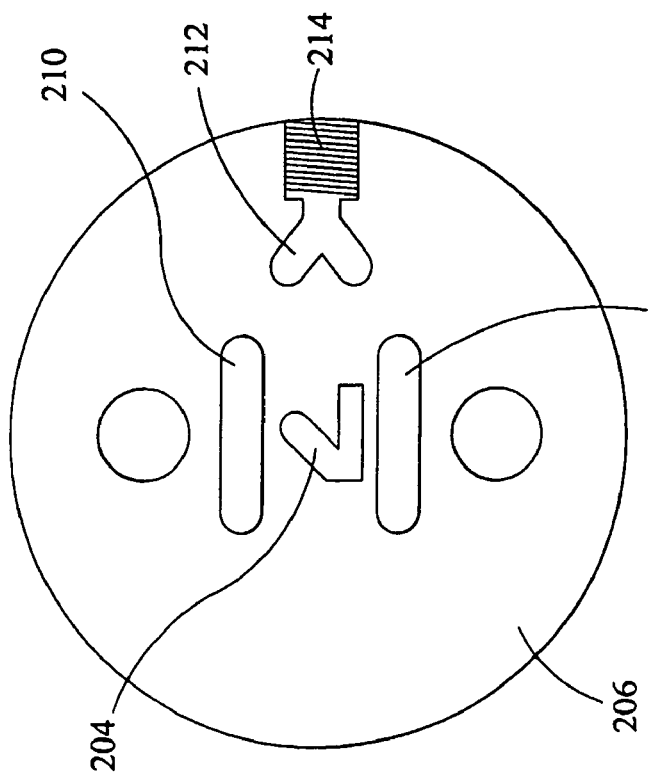
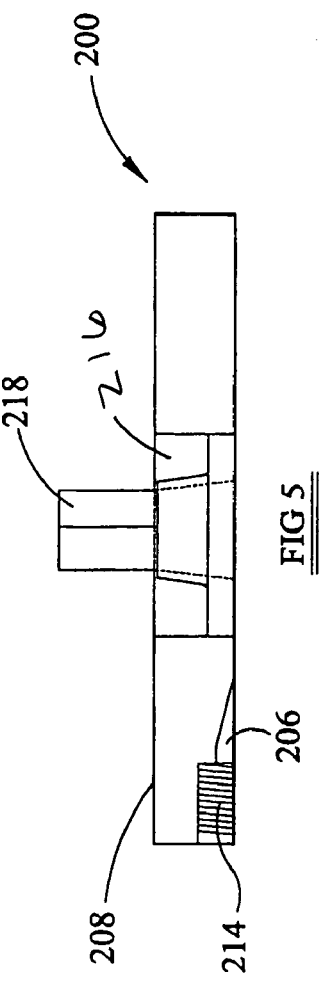

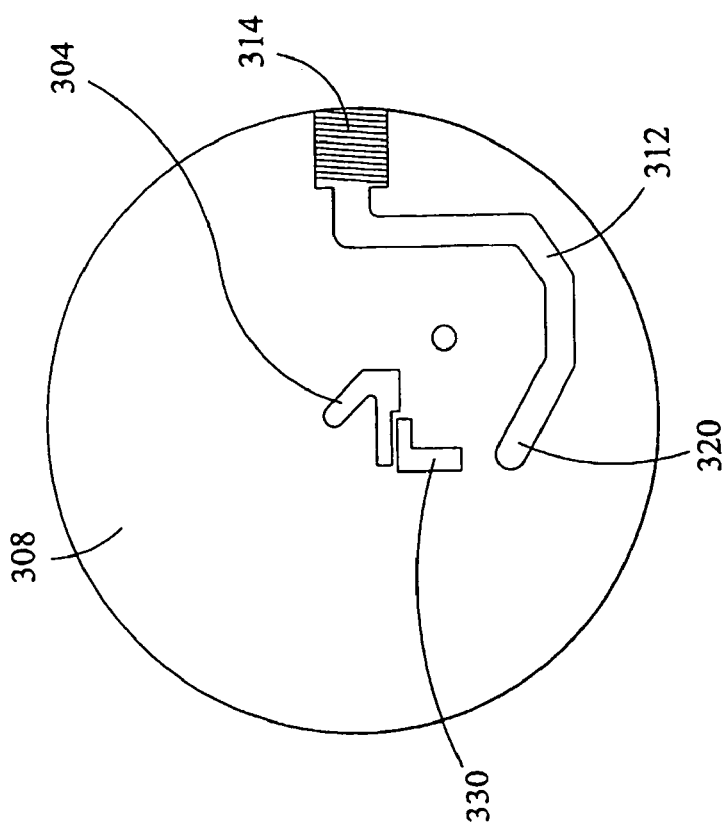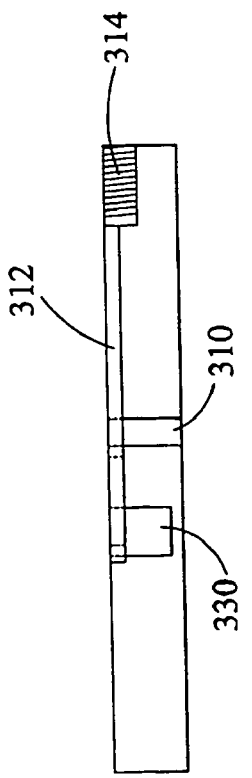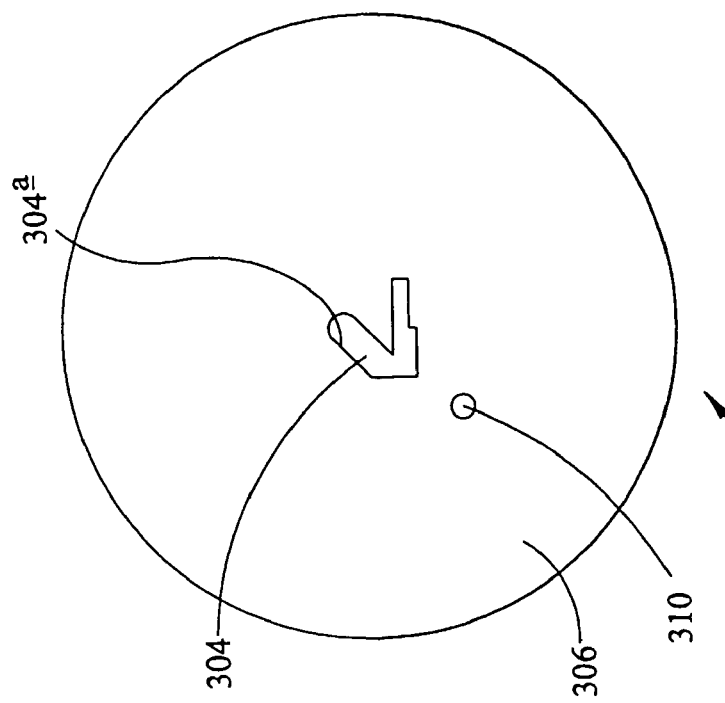

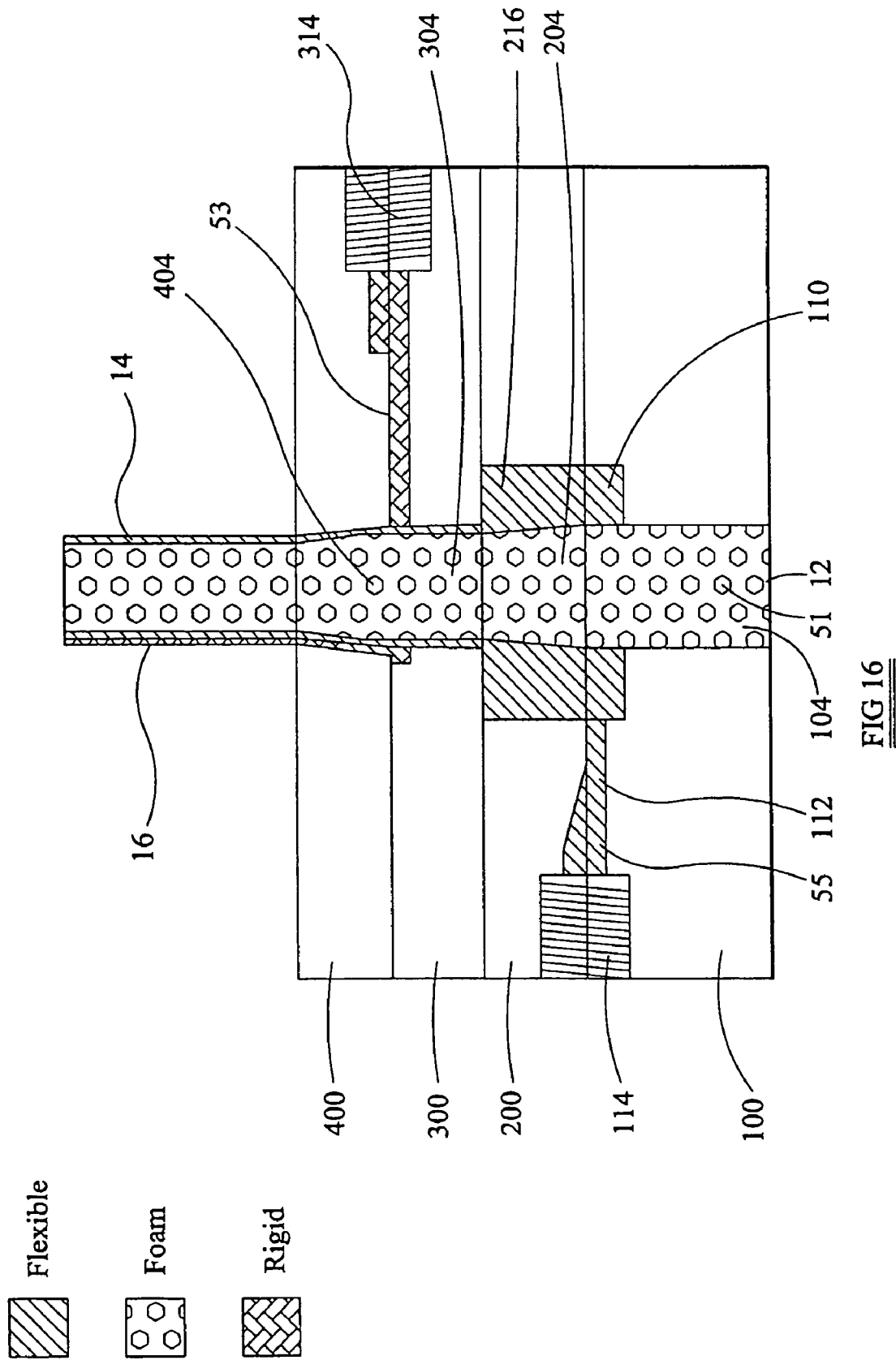

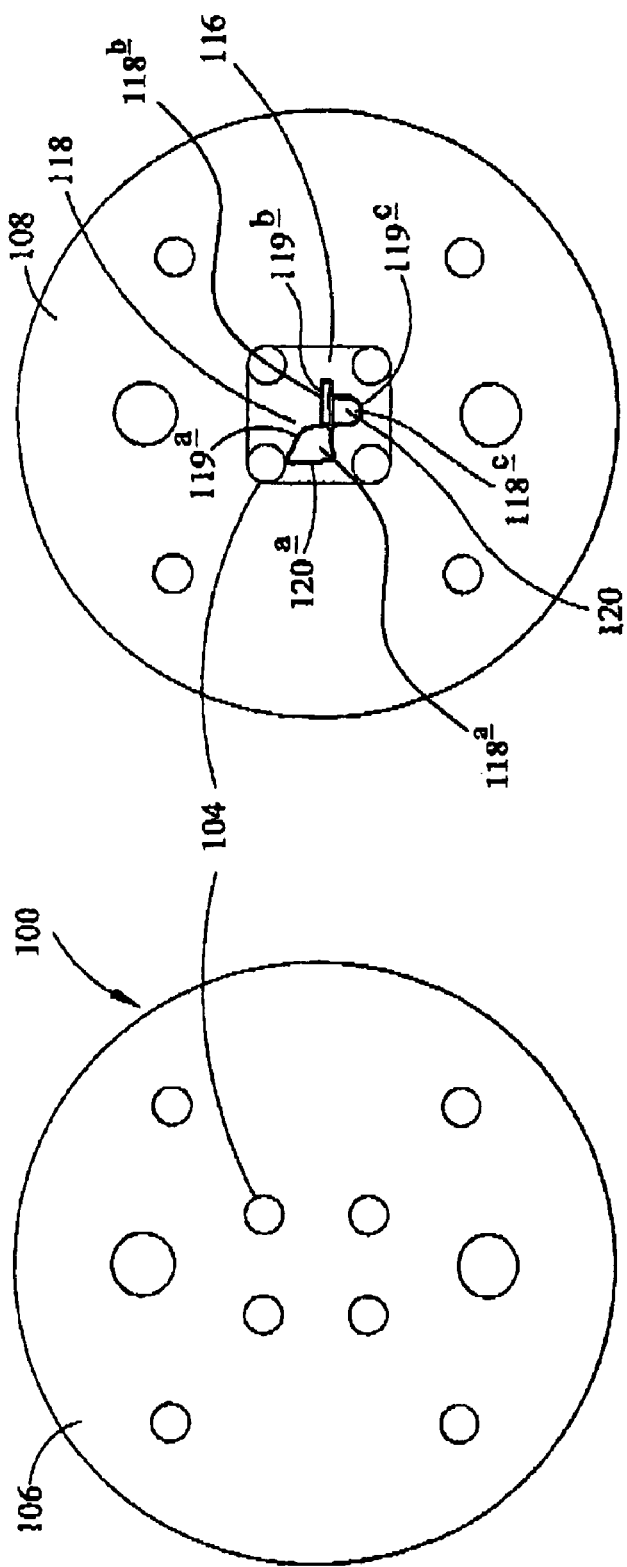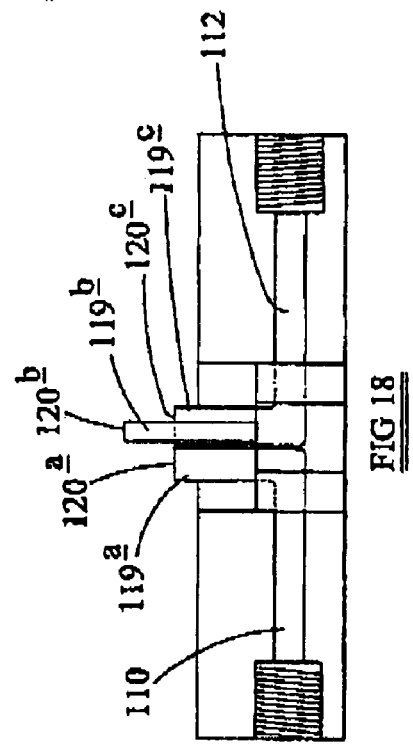

 Flexible
 Foam
 Rigid
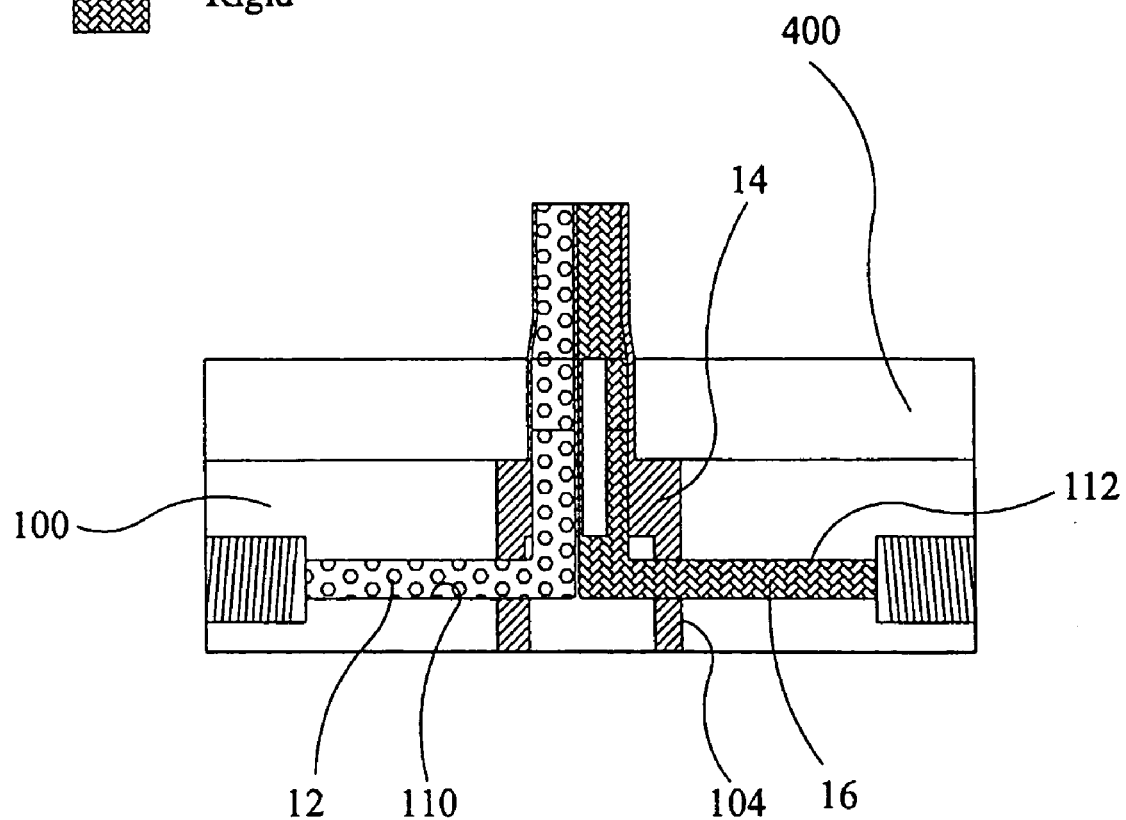
FIG 26

METHOD AND APPARATUS FOR FORMING AN EXTRUSION

CROSS-REFERENCE TO RELATED APPLICATION

This application is a National Phase Patent Application of International Application Number PCT/GB02/01635, filed on Apr. 5, 2002, which claims priority of Great Britain Patent Application No. 0108532.3, filed Apr. 5, 2001 and Great Britain Patent Application No. 0202111.1, filed Jan. 30, 2002.

The present invention relates to a method and apparatus for forming an extrusion, and particularly but not exclusively to forming a sealing element or strip.

U.S. Pat. No. 4,328,273 discloses a sealing element for attachment to a door or window, the sealing element having a resilient foam core enveloped by a wrap-around outer cover having a flexible portion and a relatively rigid portion for attaching the seal to another structure. However, a disadvantage of such sealing elements is that the cover and the core are produced separately and combined at a later stage in production.

The present invention seeks to provide an improved method of and apparatus for forming an extrusion.

Accordingly, the present invention provides method of forming an extrusion comprising: passing a first, plastics material through a first channel in a die; passing a second, plastics material through a second channel in said die; and passing a third, plastics material through a third channel in said die; and passing said second material through a metering gap means into contact with said first and third materials to cause said second material to bond with said first and third materials as said first and third materials pass through the die.

Advantageously, the second material contacts said first and third materials at different locations in the flowpath of said second material.

In a preferred form of the invention each of the three plastics materials is introduced into the die in a heat softened flowable state. The flowable state may be a liquid, semi-liquid or viscous state.

Preferably, the second material is applied as a coating to at least a portion of said first and third materials as said first and third materials pass through the die.

Advantageously, the second material retains said first and third materials in spaced relationship in the extrusion.

Preferably, the third material forms a rigid or partially rigid strip in said extrusion.

In a preferred form of the invention the third material forms a rigid or partially rigid strip bonded to a foam substrate.

The present invention also provides a die for forming an extruded profile, the die comprising: a first resin channel means for receiving a first plastics material in a flowable state; a second resin channel means for receiving a second plastics material in a flowable state; and a third resin channel means for receiving a third plastics material in a flowable state; wherein said die further comprises a metering gap means for directing said second material into contact with said first and third materials to cause said second material to bond with said first and third materials as said first and third materials pass through the die.

In a preferred form of the invention the second material is directed into contact with said first and third materials at different locations in the flow path of said second material.

Advantageously, a first metering gap is provided for directing said second material into contact with said first material and a second metering gap is provided for directing said second material into contact with said third material.

Preferably, the first and third channel means have respective extrusion orifices wherein said first channel means extrusion orifice is within said second channel means intermediate the ends thereof and said third channel means extrusion orifice is at or adjacent the downstream end of said second channel means. The metering gap is formed between each extrusion orifice and the inner wall of said second channel means.

The present invention also provides an apparatus for forming an extrusion comprising means for directing first, second and third heat softened flowable plastics material continuously into a die wherein the die comprises: a first resin channel means for receiving said first plastics material in a flowable state; a second resin channel means for receiving said second plastics material in a flowable state; and a third resin channel means for receiving said third plastics material in a flowable state; and a metering gap means for directing said second material into contact with said first and third materials to cause said second material to bond with said first and third materials as said first and third materials pass through the die.

Accordingly, the present invention provides a method of forming an extrusion comprising: introducing a first, foam material substrate into a die opening in a die and extruding said material through said die; introducing a second, plastics material into said die in a liquid state and applying said second material as a coating to said substrate as said substrate passes through the die; and introducing a third, plastics material into said die in a liquid state to bond with said first material substrate as said first material substrate passes through the die opening.

In a preferred form of the invention the third material forms a rigid or partially rigid strip bonded to said foam substrate.

The present invention also provides a die for forming an extruded profile comprising a coated substrate, the die comprising: a die opening through said die for passing the substrate material therethrough; a first resin channel for receiving a first material in a liquid state for forming the coating on said substrate material; and a second resin channel for receiving a second resin material in a liquid state; wherein said first resin channel has a metering gap for metering said first liquid resin to bring said first liquid resin into contact with said substrate material so as to form said coating thereon; and said second resin channel opens into said die opening to bring said second liquid resin into contact with said substrate material for forming a lateral extension to said substrate.

The present invention is further described hereinafter by way of example, with reference to the accompanying drawings, in which:

FIG. 4 is a view similar to that of FIG. 1 of a middle plate of the preferred form of die according to the present invention;

FIG. 5 is a view similar to that of FIG. 2 of the middle plate of FIG. 6;

FIG. 6 is a view similar to that of FIG. 3 of the middle plate of FIG. 4;

FIG. 7 is a view similar to that of FIG. 1 of a forward plate of the preferred die according to the present invention;

FIG. 8 is a view similar to that of FIG. 2 of the plate of FIG. 9;

FIG. 9 is a view similar to that of FIG. 3 of the plate of FIG. 7;

Figure 22:
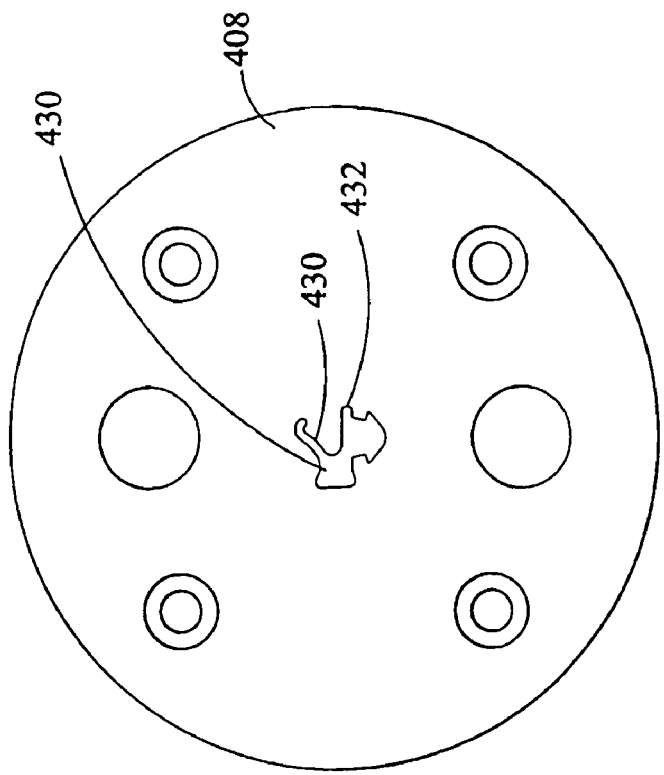
Figure 21:
Figure 20:
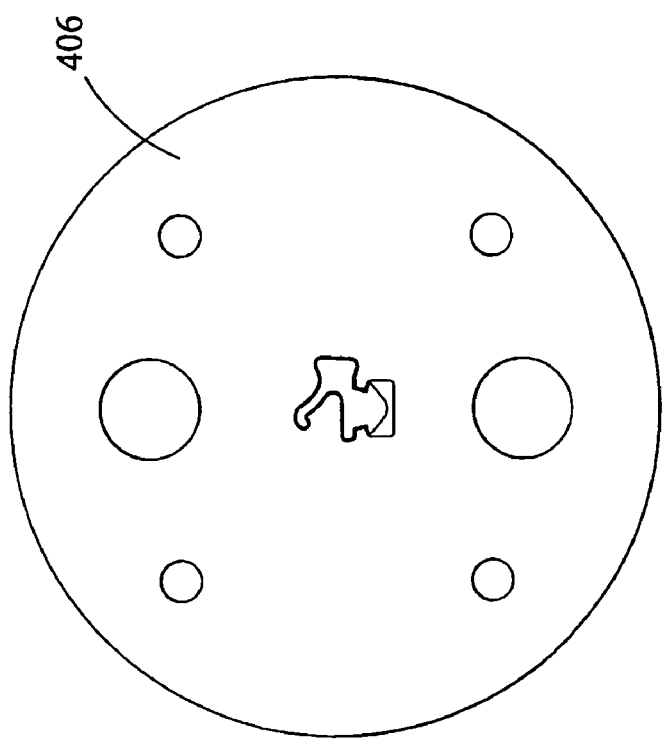
Figure 23:
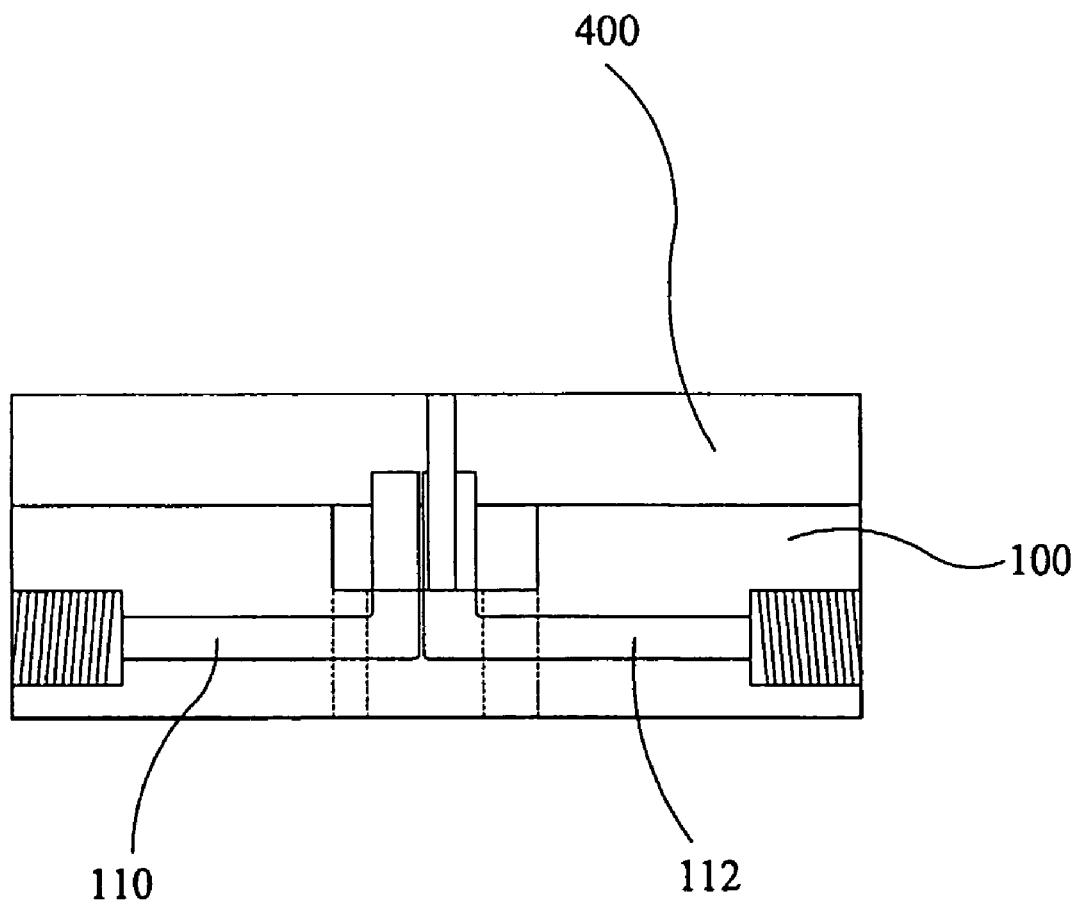
Figure 24:
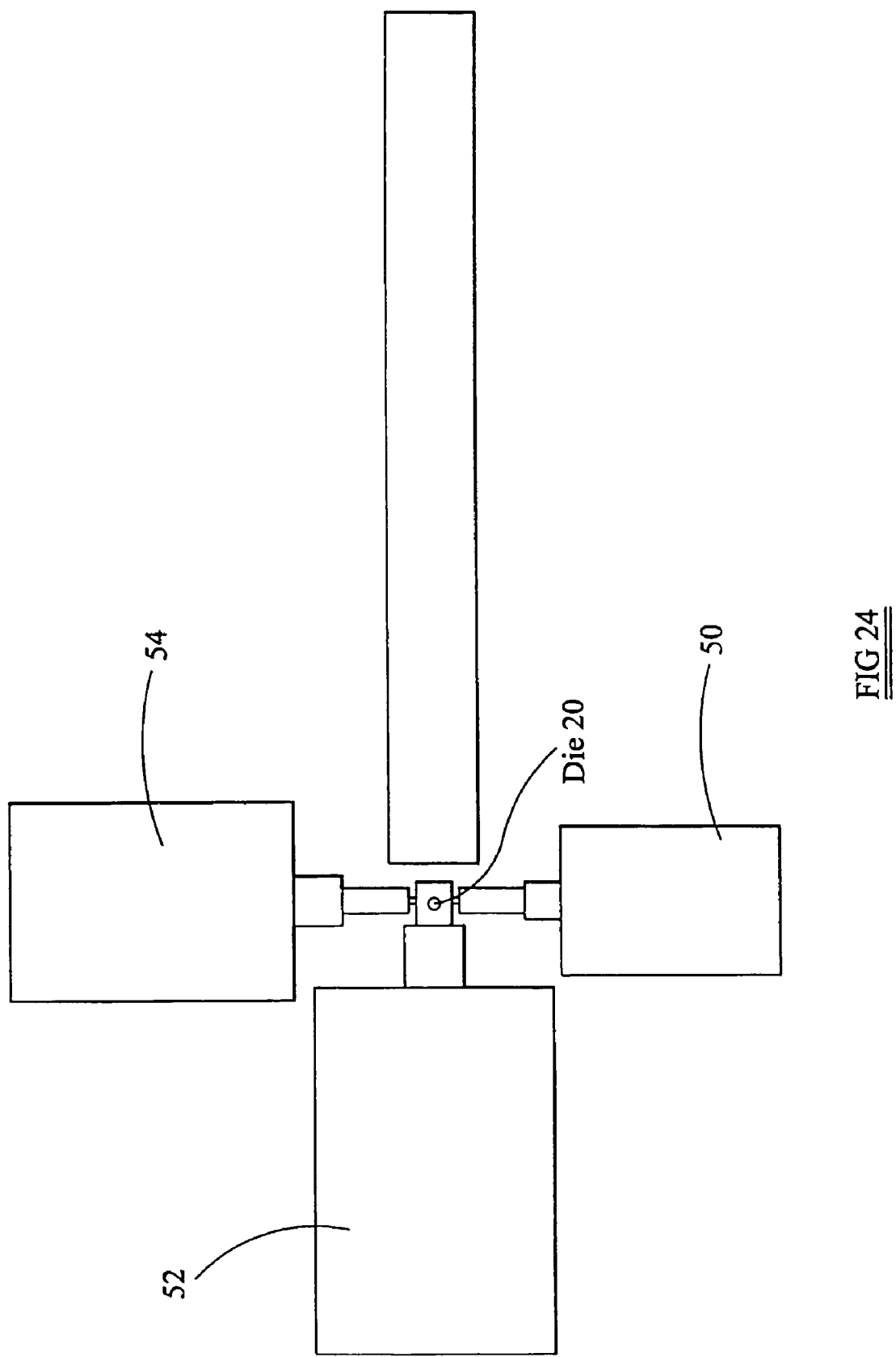
Figure 25:
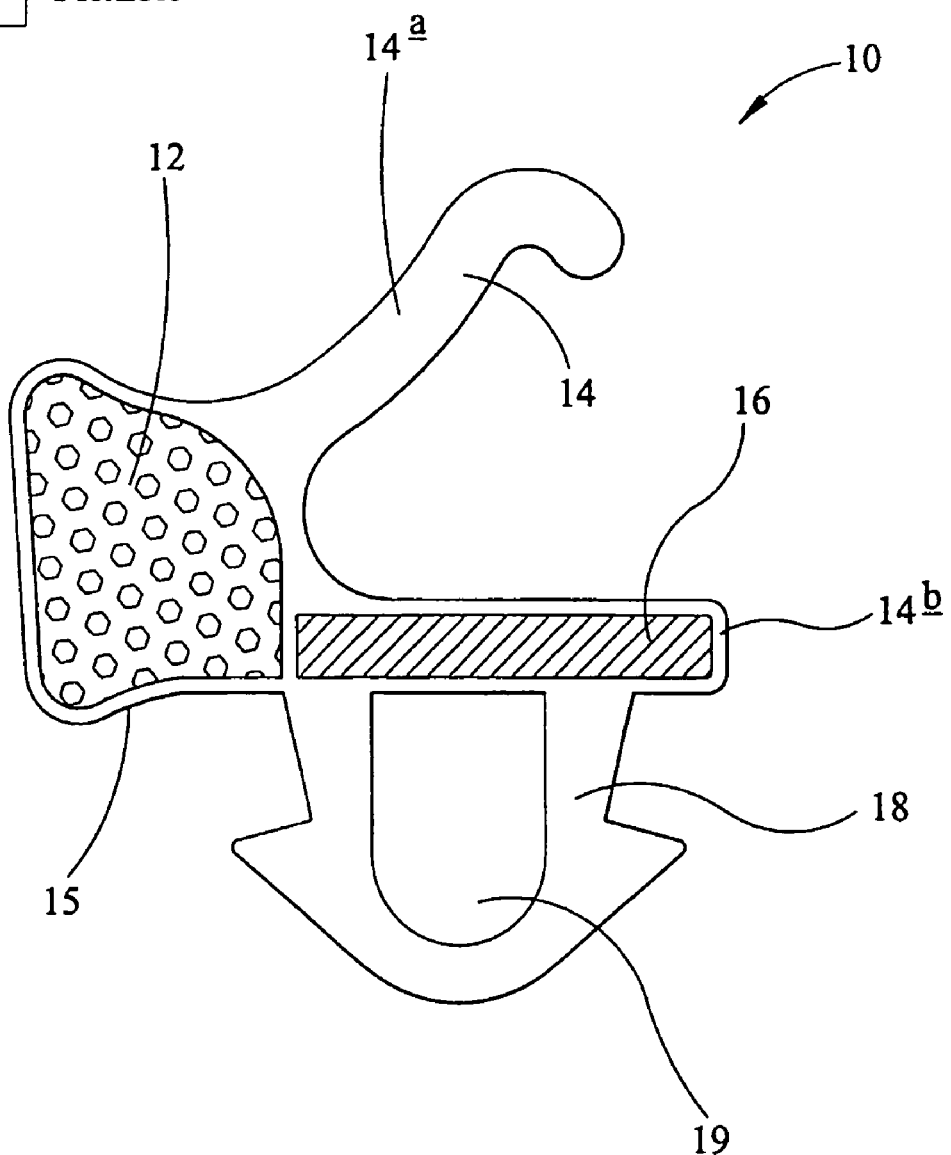

FIG. 16 diagrammatically represents the flow paths of materials through the assembled die of FIGS. 1 to 13;

FIG. 17 is an end elevation of a back plate of second a preferred form of die according to the present invention;

FIG. 18 is a partial section along the line 18-18 of FIG. 17;

FIG. 19 is an opposite end elevation of the back plate;

FIG. 20 is a view similar to that of FIG. 17 of a front plate of the second preferred form of die according the present invention;

FIG. 21 is a view similar to that of FIG. 18 of the front plate of FIG. 20;

FIG. 22 is a view similar to that of FIG. 19 of the front plate of FIG. 20;

FIG. 23 is a partial section through the assembled die of FIGS. 17 to 22;

FIG. 24 is a diagrammatic representation of an extrusion apparatus using the die of FIGS. 17 to 23;

FIG. 25 is a section through an extrusion produced by the die of FIGS. 17 to 23; and FIG. 26 is a view similar to that of FIG. 16 showing the flow paths of materials through the assembled die of FIGS. 17 to 24.

Figure 15:
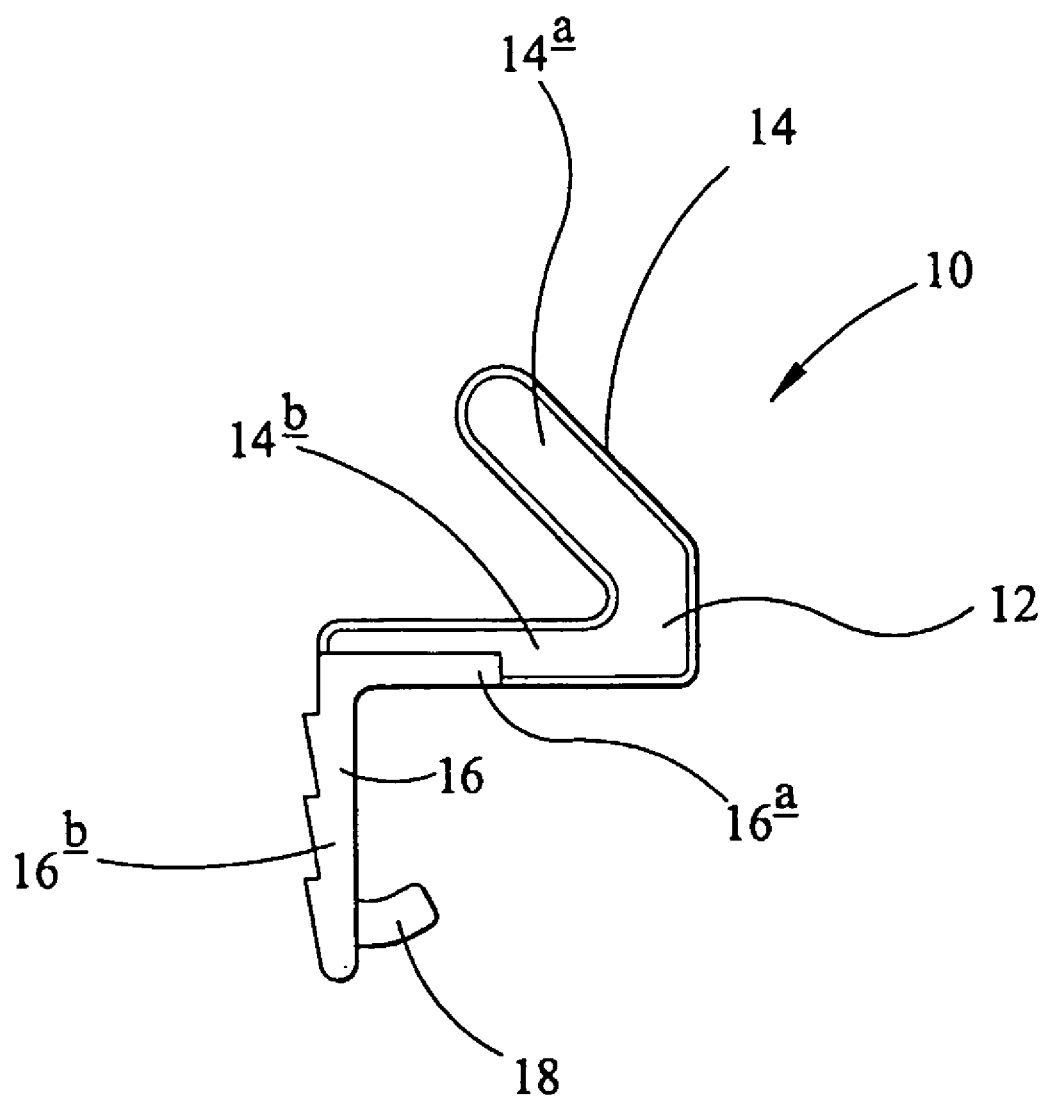
FIG. 15 is a section through an extrusion produced by the die of FIGS. 1 to 13.

Referring firstly to FIG. 15 this is a cross-section of a weather seal 10 formed by extrusion using the die of FIGS. 1 to 13. The extrusion has a core 12 formed of a first, resilient, foam material such as a thermoplastic elastomer which is covered with a flexible or partially flexible coating 14 such as a thermoplastic elastomer. Bonded with the foam core 12 is a strip 16. Whilst the strip 16 is preferably rigid, it can also be flexible or partially flexible. Finally, a rib or strip 18 of flexible or partly flexible material is bonded to the strip 16. The material forming the rib 18 is conveniently the same as the material forming the coating 14.

As can be seen from FIG. 15, the body of the extrusion has a generally V-shape formed by two arms or limbs 14a, 14b. The rigid or partly rigid strip 16 is generally L-shaped, having two arms or limbs 16a, 16b with one arm 16a bonded to the free end region of the arm 14b of the body 14. The strip 18 is bonded to the edge region of the free arm 16b of the L-shaped strip 16.

Referring to FIGS. 1 to 13 these show a preferred form of die 20 according to the present invention which is formed by four plates, a back plate 100, a middle plate 200, a forward plate 300 and a front plate 400.

Figures 1, 2, 3:
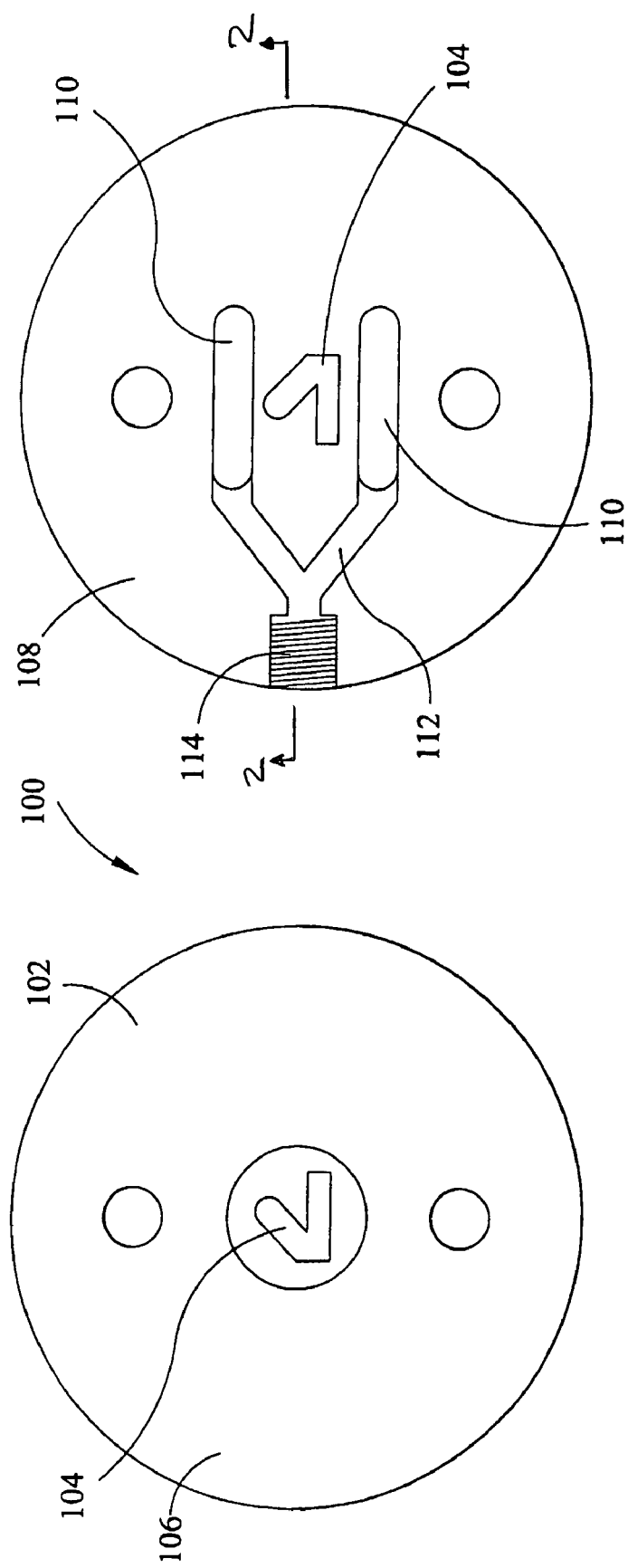
FIG. 1 is an end elevation of a back plate of a preferred form of die according to the present invention.
FIG. 2 is a partial section along the line 2-2 of FIG. 3.
FIG. 3 is an opposite end elevation of the back plate.

FIGS. 1 to 3 show the back plate 100 which has an outer face 106 and an inner face 108. A die opening in the form of a resin channel 104 extends through the centre of the back plate and as can be seen from FIGS. 1 and 3 is generally V-shaped, corresponding to the V-shaped body of the extrusion 10.

FIGS. 4 to 6 show the middle plate 200 which has a back face 206 and a forward face 208. The back face 206 is intended to abut the inner face 108 of the back plate 100.

The middle plate 200 has a resin channel 204 which is intended as an extension of the resin channel 104 of the back plate 100.

The back plate 100 has two elongate, parallel channels 110 formed in the inner face 108. These channels open into the face 108 and are formed one above and one below the resin channel 104. The channels 110 communicate through respective arms of a Y-shaped channel 112 to an inlet half 114, both of which are formed in the inner surface 108 of the back plate.

The middle plate 200 has channels 210 corresponding to the channels 110 of the back plate but the channels 210 of the middle plate extend fully through the middle plate. The middle plate also has an inlet half 214 which, in the assembled die, combines with inlet half 114 of the back plate to form an inlet for a second, coating material. When the two plates are joined together with back face 206 of the middle plate abutting the inner face of the back plate, the channels 110, 210 align such that material which is fed under pressure into the inlet 114 flows through the channels 112, 110 into the channels 210.

The channels 210 of the middle plate open into a generally rectangular recess 216 formed in the forward face 208 of the plate. When the middle plate is joined to a forward plate 300 the recess 216 forms a reservoir for the material.

As can be seen in FIGS. 5 and 6 the recess 216 carries an upstanding tubular portion or extension 218 which forms an extension of the resin channel 204. As can be seen from FIG. 6 extension 218 has a cross-sectional shape which corresponds to that of the desired cross-sectional shape of the body 14 of the extrusion 10. The extension 218 projects above the forward face 208 of the middle plate 200 and engages through the forward plate 300 as described below.

FIGS. 7 to 9 show the forward plate which has a middle face 306 and a front face 308. The middle face 306 abuts the forward face 208 of the middle plate in the assembled die and a through-hole or channel 310 which extends fully through the forward plate 300 aligns with the right-hand end of the lower channel 210 of the middle plate as seen in FIG. 6. This allows the second material to flow from the reservoir 216 and channel 210 into the through-channel 310.

The forward plate 300 also has a resin channel 304 which is an extension of the resin channels 104, 204. Channel 304 has a cross-sectional shape corresponding to that of the projection 218 but is dimensioned so as to provide a preferably uniform gap between the inner wall 304a of the channel 304 and the outer surface 218a of the extension 218. This provides a metering gap for the second material and allows the second material to flow from the reservoir 216 through the gap between the channel 310 and the extension 218. The material flows past the open end of the extension 218 to contact the foam extruding out of the extension 218 and bond with the foam outer surface.

The front face 308 of the forward plate 300 also has a channel 312 and an inlet half 314 which are open to the front face 308. The front plate 400 has a cooperating inlet half 414 and channel 412 formed in the inner face 406 such that when the die is assembled with the inner face 406 abutting the forward face 306 the inlet halves 314, 414 and channels 312, 412 combine to form a further inlet and channel for the third material. The channel 312 has an end portion 320 which, in the assembled die, aligns with a through-channel 420 in the front plate 400. The channel 420 has a relatively large opening in the inner face 406 of the front plate 400 but the channel narrows to its opening 422 towards the outer face 408 of the plate 400. This brings a portion of the third material through to form the strip 18 and the opening 422 is shaped to provide the shaped flexible strip 18 of the extruded product.

Figure 12:
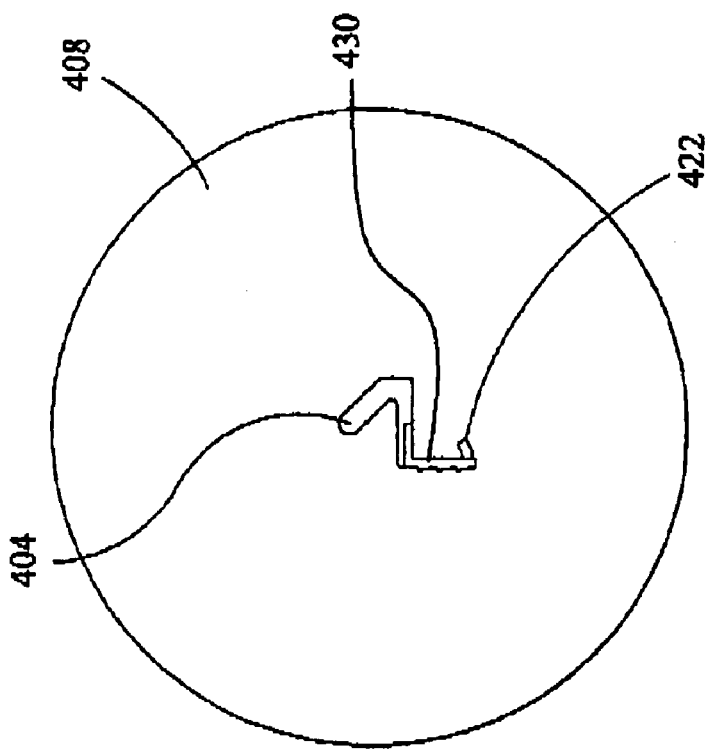
FIG. 12 is a view similar to that of FIG. 3 of the front plate of FIG. 10.
Figure 11:
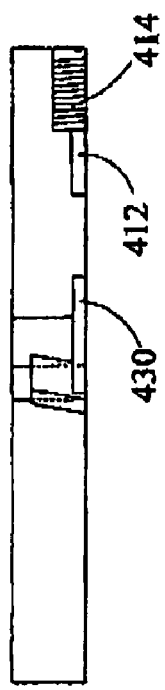
FIG. 11 is a view similar to that of FIG. 2 of the front plate of FIG. 12.
Figure 10:
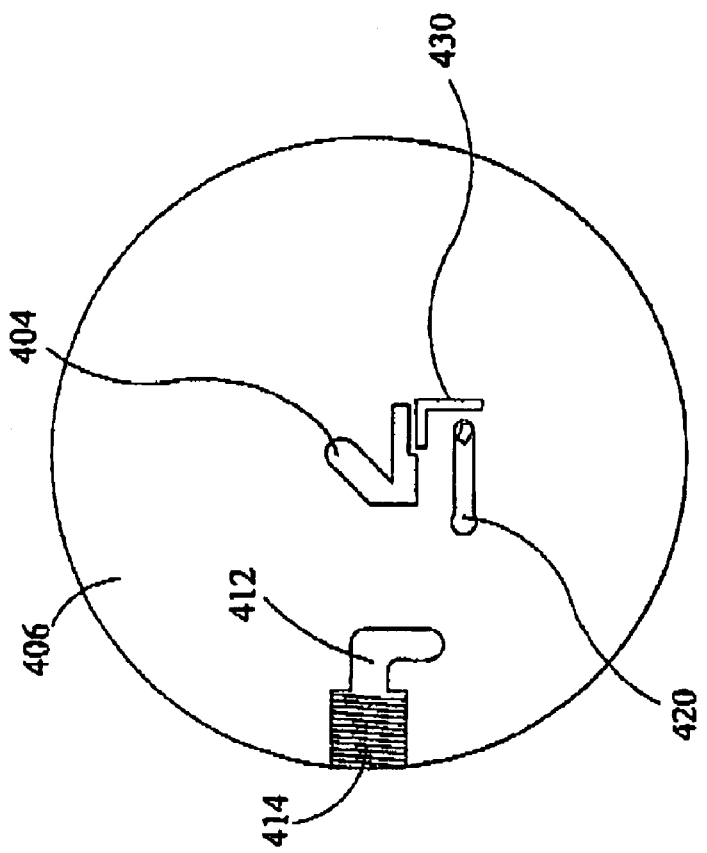
FIG. 10 is a view similar to that of FIG. 1 of a front plate of the preferred form of die according the present invention.
Figure 13:
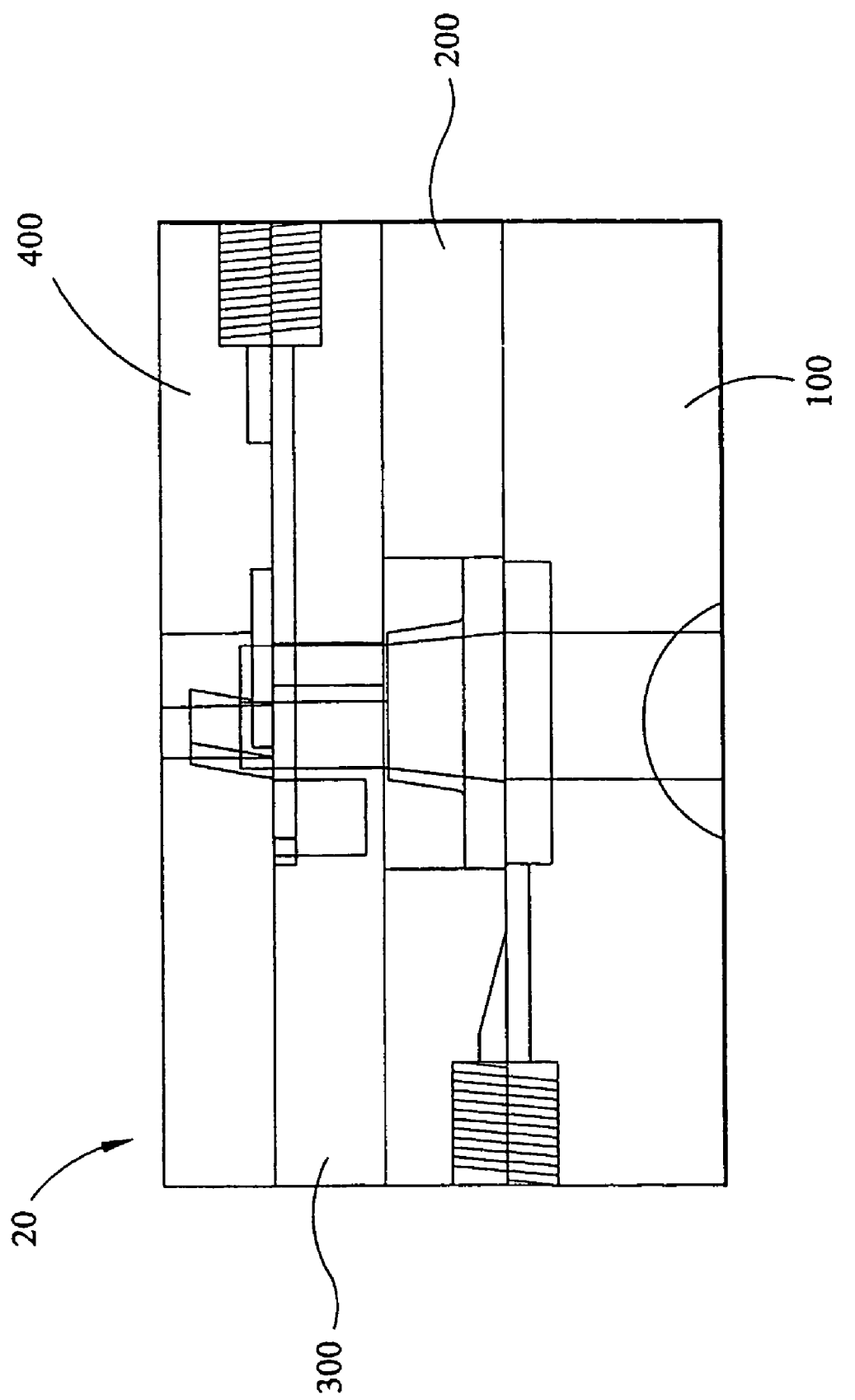
FIG. 13 is a partial section through the assembled die of FIGS. 1 to 12.

The continuation of the resin channel 104, 204, 304 is shown at 404 in FIGS. 10 and 12. The length of the extension 218 of the middle plate 200 is such that it projects into the channel 404 but does not extend to the outer face 408 of the plate 400. As can be seen in FIGS. 10 and 12 the opening of the channel 404 in the outer face 408 is of reduced dimension compared to the opening in the forward face 406.

The front plate 400 is also provided with a further through-channel 430 which is of generally L-shape and as can be seen from FIG. 10 its opening into the forward face 406 lies adjacent one arm of the extrusion channel 404. However, as can be seen from FIG. 12 the two channels 404, 430 join at a point partway through the front die plate 400 such that the openings of the channels 404, 430 and 422 in the outer face 408 are combined to the profile of the end product shown in FIG. 15.

The front face 308 of the forward plate 300 has an L-shaped recess 330 which aligns with the recess 430 of the front plate 400 when the die is assembled but is wider than the recess 430 to form a relatively small reservoir. Resin is supplied to the recess 330 and channel 430 by way of the channel 312, one limb of the channel 430 bridging the gap between the end 320 of the channel 312 and the recess 330 to allow the passage of resin.

Figure 14:
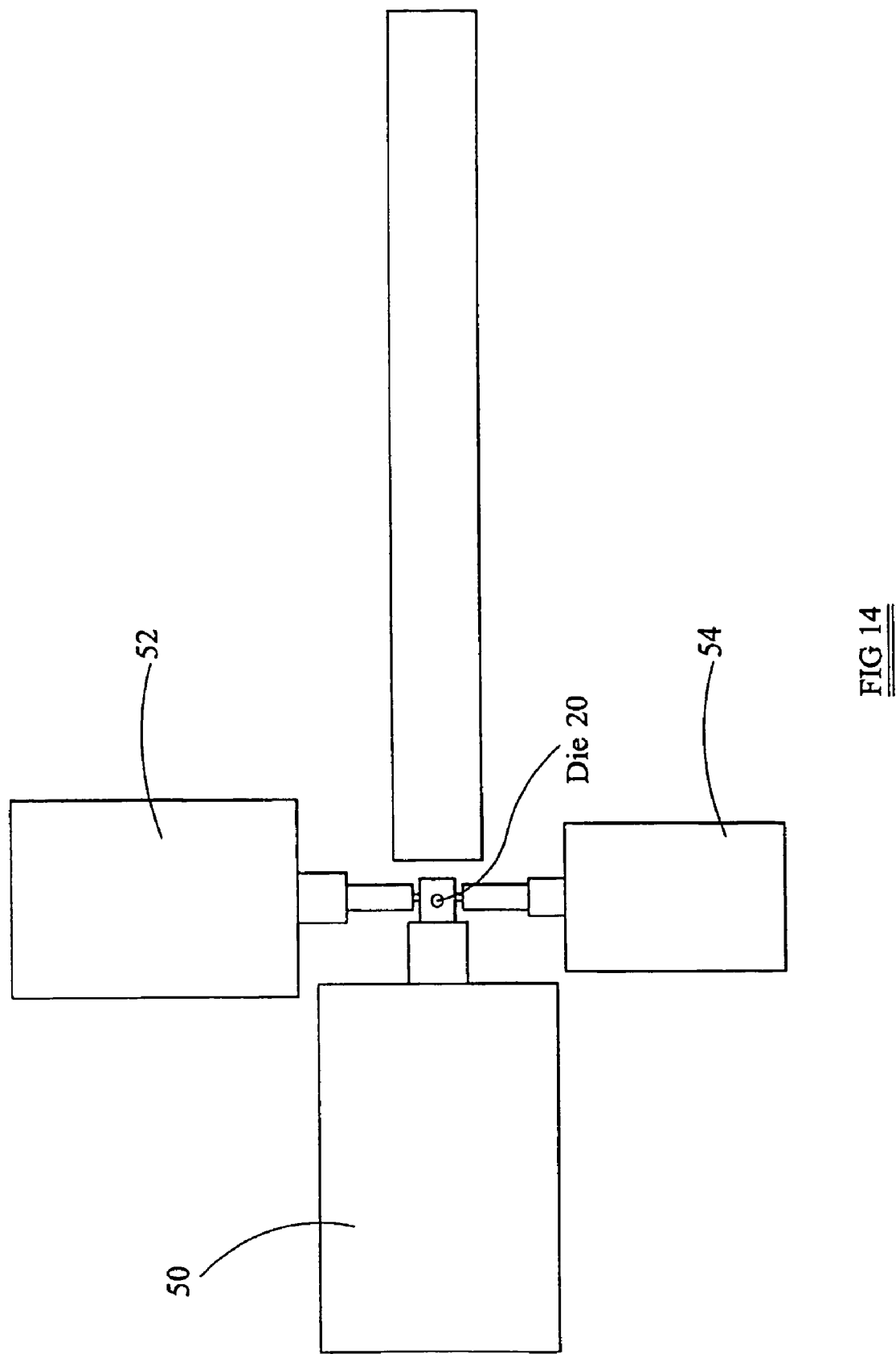
FIG. 14 is a diagrammatic representation of an extrusion apparatus using the die of FIGS. 1 to 13.

FIG. 14 shows an assembled system for producing the extrusion, the system having a first source 50 of the foam material, a second source 52 of the second, plastics material which is rigid or partially rigid when set or cured, and a third source 54 of the third, plastics material which is flexible or partially flexible when set or cured. These materials are extruded through the die 20 to form the extruded product.

In operation, the die 20 is firstly heated to a set temperature and the foam material is fed in a heat softened flowable state through the die channel 104, 204, 304, 404 of the die. Once the foam extrusion begins to exit the die through the combined openings 404, 422, 430 the second material is fed in a heat softened flowable state or liquid form from the source 54 through the inlet 114 214, the channels 112, 212, the channels 110, 210, the reservoir 216, between the walls of the channel 304, 404 and the protrusion 218 until it comes into contact with the outer surface of the extruding foam. The two materials naturally bond together and exit the die. At the same time, the third material is fed again in a heat softened flowable state or liquid form into the die through the inlet 314, 414 and channels 312, 430 and 330 such that it flows into contact with and bonds naturally with the foam material and, where applicable, the second material at or adjacent the outer end of the extension 218.

Finally the second material is also fed from the channel 210 and reservoir 216 through the channel 310 into the channel 420 where it contacts and naturally bonds to the third material as it flows through the channel 430 in the front plate 400.

FIG. 16 shows in diagrammatic form the flow of the materials 51 through the die.

The foam material 12 is passed through the die channel 104, 204, 304, 404 of the die and the second, flexible material 55 which forms the coating or skin 14 and the rib 18 is fed into the die through the inlet 114, 214. The third, rigid or semi-rigid material 53 is fed into the die through inlet 314 to form the strip 16 which is bonded to both the substrate 51 and the material 55 which forms the coating 14 and flexible strip 18.

It will be appreciated, therefore, that in the above process all three materials bond together through a combination of temperature and pressure within the die with the final profile of the extruded product being shaped by the openings 404, 422, 430 in the front face 408 of the die plate 400.

Referring now to FIGS. 17 to 26 these show a second preferred embodiment of die and extrusion process according to the present invention.

Referring firstly to FIG. 25, this is a cross-section of a weather seal 10 formed by extrusion using the die of FIGS. 17 to 23. The extrusion has a first portion or core 12 formed of a first, plastics material which in this example is a resilient, foam material such as a thermoplastic elastomer.

The extrusion has a second portion 14 formed by a second plastics material such as a thermoplastic elastomer. This forms a flexible or partially flexible coating or body which encloses the core 12.

As can be seen from FIG. 25, the body 14 of the extrusion has a generally V-shape formed by two arms or limbs 14a, 14b with the core 12 enclosed within the base 15 of the V. A third portion of the extrusion is formed by a third plastics material which forms a generally planar strip 16 which is fully enclosed by the material of the limb 16a. The latter effectively forms a coating over the strip 16. The material of the body 14 thus encloses and maintains the core 12 and strip 16 in spaced relationship. Whilst the strip 16 is preferably rigid, it can also be flexible or partially flexible.

The body 14 also has a flange 18 which extends laterally of the limb 14b. The flange is generally U-shaped having two limbs 18a, 18b with the open end of the U being closed by the limb 16b. Thus the flange is formed with an internal cavity or air space 19 which extends longitudinally of the extrusion. The flange base is shaped like an arrowhead in cross section as a retension feature in use.

Referring to FIGS. 17 to 23 these show a preferred form of die 20 according to the present invention which is formed by two plates, a back plate 100 and a front plate 400. Two plates are used for convenience here and it will be appreciated that more than two could be used.

FIGS. 17 to 19 show the back plate 100 which has an outer face 106 forming the rear face of the die, and an inner face 108. Four generally parallel resin channels 104 extend through a central region of the back plate and open into a generally rectangular recess 116 formed in the inner face 108 of the plate. When the back plate is joined to the front plate 200 the recess 116 forms a reservoir for the second plastics material.

As can be seen in FIGS. 18 and 19 the recess 116 carries in or about its central region an upstanding portion or extension 118 which is formed by a number of tubular extensions 118a, 118b and 118c. Extension 118a is provided for the material which forms the core 12 of the extrusion and extension 118b is provided for the material which forms the strip 16. These tubular extensions have cross-sectional shapes which correspond to the desired shapes of the core 12 and strip 16 and connect respectively to two elongate channels 110, 112 formed in the plate 100 through which the materials for the core 12 and the rigid strip 16 are passed.

The tubular extension 118c is provided for the flange 18 and because it is intended to form the cavity 19 it is provided with an air passage in the form of a bleed hole 120 which allows air external to the die to flow into the cavity 19 as it is formed. Without the bleed hole there would be a danger of the cavity being collapsed by external pressure. The bleed hole 120 could, of course, be replaced by a further channel (not shown) similar to channels 110, 112. This could be used to pass one of the extrusion materials or a fourth plastics material to fill the cavity 19 with, for example, a foam material.

The tubular extensions are formed by walls 119a, 119b and 119c which are generally of the same thickness and, as can be seen from FIG. 18, extend beyond the inner face 108 of the back plate 100. The wall 119a generally defines the shape of the core 12 and at the outer end of the extension 118a forms an extrusion orifice 120a. The wall 119b generally defines the shape of the strip 16 and at the outer end of the extension 118b forms an extrusion orifice 120b. The wall 119c generally defines the shape of the cavity 19 and forms an orifice 120c.

As can be seen from FIG. 18, the walls 119a and 119c project by about the same amount beyond the inner face of the back plate 100 whilst the wall 119b projects substantially further.

The front plate 400 has an inner face 406 and an outer face 408 forming the front face of the die. It is also provided with a through-channel 430 which opens into the front face 408. At its outer end 432 (at the front face 408) the channel 430 is of a cross-sectional shape which corresponds to that of the desired extrusion 10. The channel 430 aligns with the recess 116 and the extension 118 of the back plate 100 such that when the die is assembled the extension 118 projects into the channel 430, as can be seen from FIG. 22. The difference in lengths of the walls 119a, 119b and 119c means that the walls 119a and 119c and thus the extrusion orifices 120a, 120b terminate within the channel 430, approximately half way through the front plate 400 whilst the wall 119b terminates at or adjacent the front face 408. The extrusion orifices 120a, 120b could, of course, be provided at any suitable location in the channel 430.

The channel 430 has an opening in the inner face 406 of the front plate 400 which is larger than the outer end 432 but the channel narrows or tapers inwardly towards its opening 432 in the outer face 408 of the plate 400. The walls 119a, 119b and 119c of the extension and the inner wall of the channel 430 form a preferably uniform gap around most of the periphery of the extension 118. This provides a metering gap for the second material and allows the second material to flow from the reservoir 116 through the gap between the channel 430 and the extension 118, and past the open ends of the extension 118 to contact and bond with the foam and strip material extruding out of the extension 118. Although the metering gap between the walls 119a, 119b and 119c of the extension and the inner wall of the channel 430, around most of the periphery of the extension 118, is preferably uniform, it will be appreciated that the gap may vary to vary the thickness of the coating of the second plastics material around the core 12 and strip 16.

The limb 14a is formed by a correspondingly shaped portion of the channel 404. It will be appreciated that the external shape of the extrusion, including any flanges or limbs such as limb 14a can be varied by varying the shape of the outer end 432 of the channel 430. Thus, a number of different die front plates can be used with a variety of back plates to give extrusions having a variety of cross-sectional shapes with a variety of shapes of core 12, strip 16 and cavity 19.

An assembled system for producing the extrusion is shown in FIG. 24. The system has a fist source 50 of the first resin, a second source 52 of the second resin which is flexible or partially flexible when set or cured, and a third source 54 of the third resin which is rigid or partially rigid when set or cured. These materials are extruded through the die 20 to form the extruded product.

FIG. 26 shows in diagrammatic form the flow of the materials through the die.

The foam material 12 forming the core is passed through the die channel 110, 118a of the die. The flexible or partially flexible material 14 which encloses the core is fed into the die through the inlet holes 104 into the reservoir 116 and passes around the extension 118. The third, rigid or partially rigid material 16 is fed into the die through inlet 112 and then through tubular extension 118b and orifice 120b to form the strip 16.

In operation, the three sources of resin are heated to provide the resins in liquid, semi-liquid or viscous form. The degree of viscosity of each resin is not important provided the resins can flow through the die. The die 20 is also heated to a set temperature to allow the resins to flow through the die. The core material is passed through the die channel 110 of the die and the strip material is passed through the die channel 112.

Once the first and third materials begin to exit the die through the combined openings 118a, 118b the second material is fed in liquid form from the source 52 through the channels 104 and the reservoir 116, between the walls of the channel 430 and the extension 118 until it comes into contact with the outer surfaces of the extruding first and third materials. The materials naturally bond together and exit the die as the complete extrusion.

The invention claimed is:

1. A method of forming an extrusion comprising:
    passing a first plastic material through a first channel, a second channel and a third channel in a die;
    passing a second plastic material through the second channel in said die;
    and passing a third plastic material through the third channel in said die;
    wherein each of said plastic materials is introduced into said die in a flowable state, wherein said first plastic material when passed through said first, second and third channels forms a core of said extrusion, wherein said second channel abuts said first channel, wherein an outer surface of said first channel is greater in dimension than an inner surface of said second channel forming a recess surrounding said first channel, and wherein said second material is passed through said recess into contact with said first material such that said recess acts as a metering gap to cause said second material to bond with and surround said first material as said materials pass through the die.

2. A method as claimed in claim 1 wherein said second material is passed through said metering gap into contact with said first and third materials to cause said second material to bond with said first and third materials as said first and third materials pass through the die.

3. A method as claimed in claim 1 wherein the second material contacts said first and third materials at different locations in the flowpath of said second material.

4. A method as claimed in claim 1 wherein each of the three plastic materials is introduced into the die in a heat softened flowable state.

5. A method as claimed in claim 4 wherein said flowable state is one of a liquid, semi-liquid or viscous state.

6. A method as claimed in claim 1 wherein the second material is applied as a coating to at least a portion of said first and third materials as said first and third materials pass through the die.

7. A method as claimed in claim 6 wherein the second material retains said first and third materials in spaced relationship in the extrusion.

8. A method as claimed in claim 1 wherein the third material forms a rigid or partially rigid strip in said extrusion.

9. A method as claimed in claim 1 wherein the third material forms a rigid or partially rigid strip bonded to said first material.

10. A method as claimed in claim 1 wherein each of said second and third materials is passed through a respective metering gap into contact with at least one of the other of said materials to cause each said second and third materials to bond with said at least one of said other of said materials as said materials pass through the die.

11. A method as claimed in claim 1 wherein said first plastic material comprises foam.

12. A method as claimed in claim 1 wherein said core is a central solid core.

* * * * *